United States Patent [19]

Purdy

[11] 4,373,776
[45] Feb. 15, 1983

[54] PROTECTION CASE FOR OPTICAL FIBER SPLICES

[75] Inventor: Michael L. Purdy, Stittsville, Canada

[73] Assignee: Northern Telecom Limited, Montreal, Canada

[21] Appl. No.: 164,091

[22] Filed: Jun. 30, 1980

[51] Int. Cl.³ .............................................. G02B 7/26
[52] U.S. Cl. .................................................. 350/96.20
[58] Field of Search ............ 174/59; 350/96.20, 96.21, 350/96.22

[56] References Cited

U.S. PATENT DOCUMENTS

| 4,171,867 | 10/1979 | Cocito | 350/96.21 |
| 4,266,853 | 5/1981 | Hutchins et al. | 350/96.20 |
| 4,319,951 | 3/1982 | Korbelak et al. | 350/96.21 X |
| 4,332,435 | 6/1982 | Post | 350/96.20 |

FOREIGN PATENT DOCUMENTS

| 2363243 | 3/1978 | France | 350/96.21 |
| 2428850 | 1/1980 | France | 350/96.21 |
| 52-13346 | 2/1977 | Japan | 350/96.21 |
| 55-62414 | 5/1980 | Japan | 350/96.20 |
| 55-62415 | 5/1980 | Japan | 350/96.20 |

*Primary Examiner*—John D. Lee
*Attorney, Agent, or Firm*—Sidney T. Jelly

[57] ABSTRACT

A protection case for optical fiber splices is in the form of an elongate box having ducts along each side and a plurality of packet members pivotally attached to the bottom of the case in overlapping relationship. A holder in each packet will hold at least one splice, or an attenuator and two associated splices. A cover fastens over the base of the case. The packets have the form of shallow boxes and extra fiber is coiled around in a packet, being retained by turned in edges of the top, sides and bottom.

11 Claims, 7 Drawing Figures

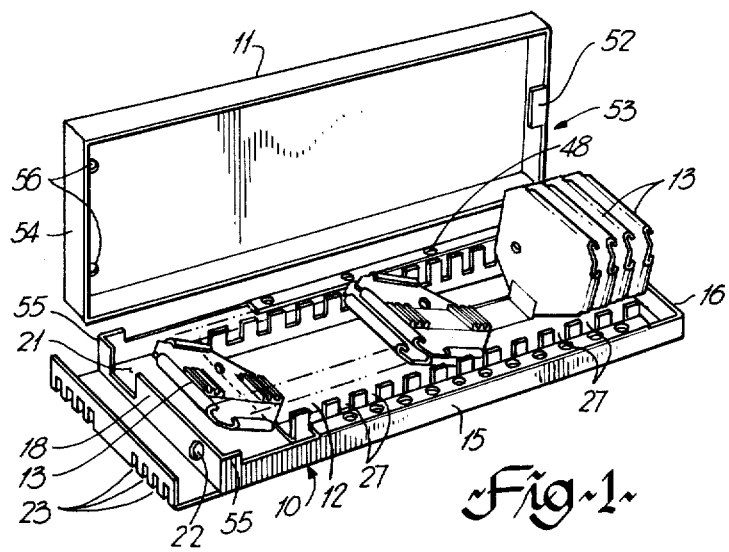
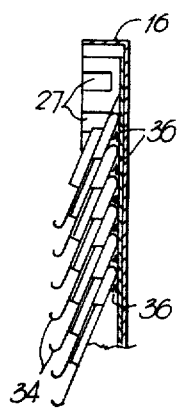
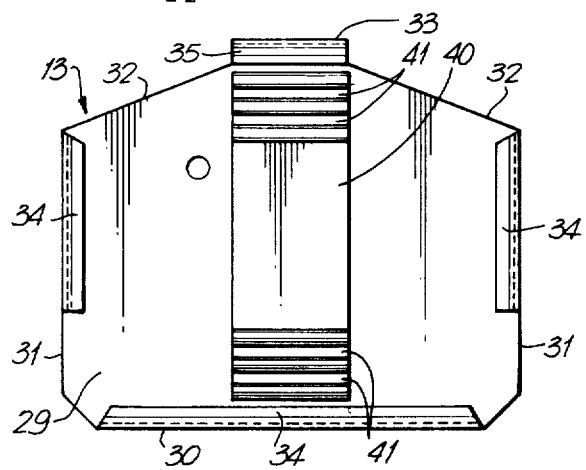
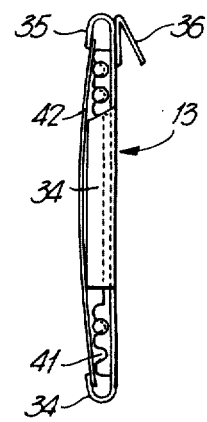
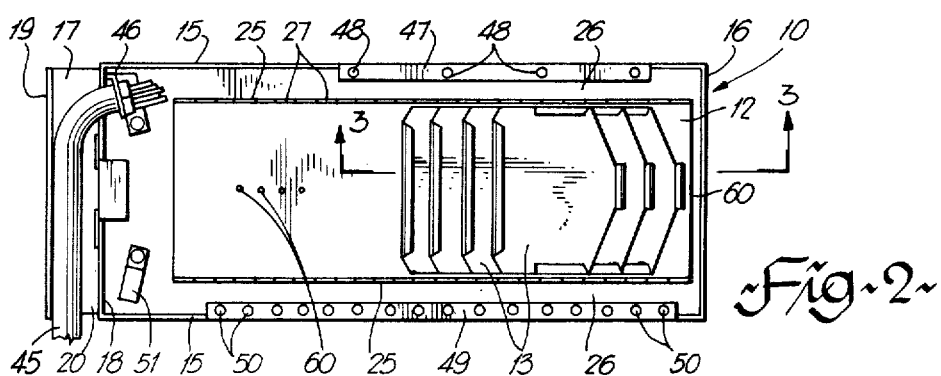

U.S. Patent  Feb. 15, 1983  Sheet 2 of 2  4,373,776
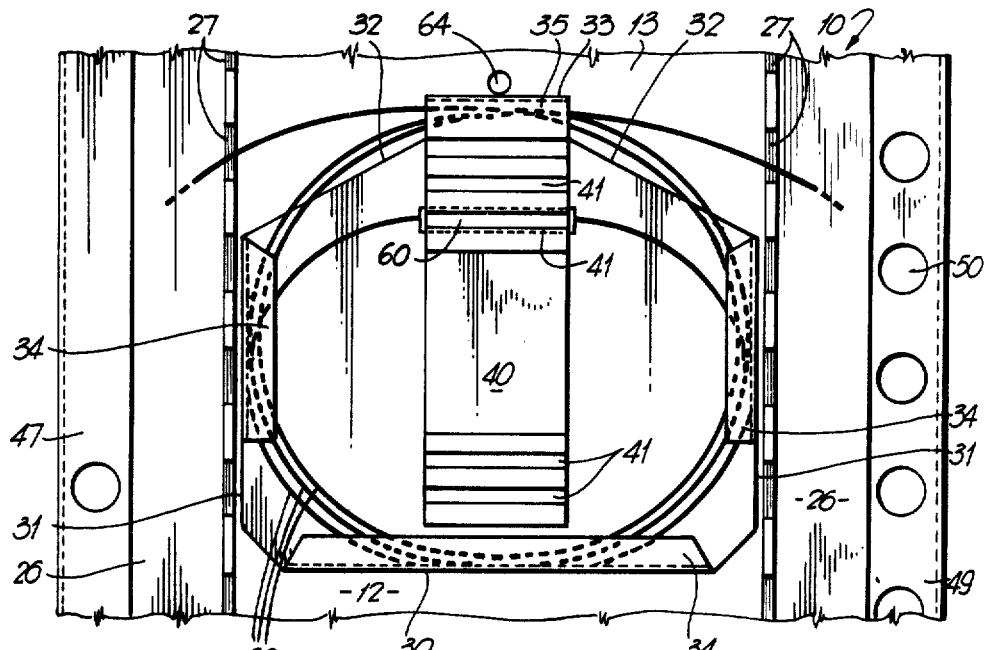
Fig-6-
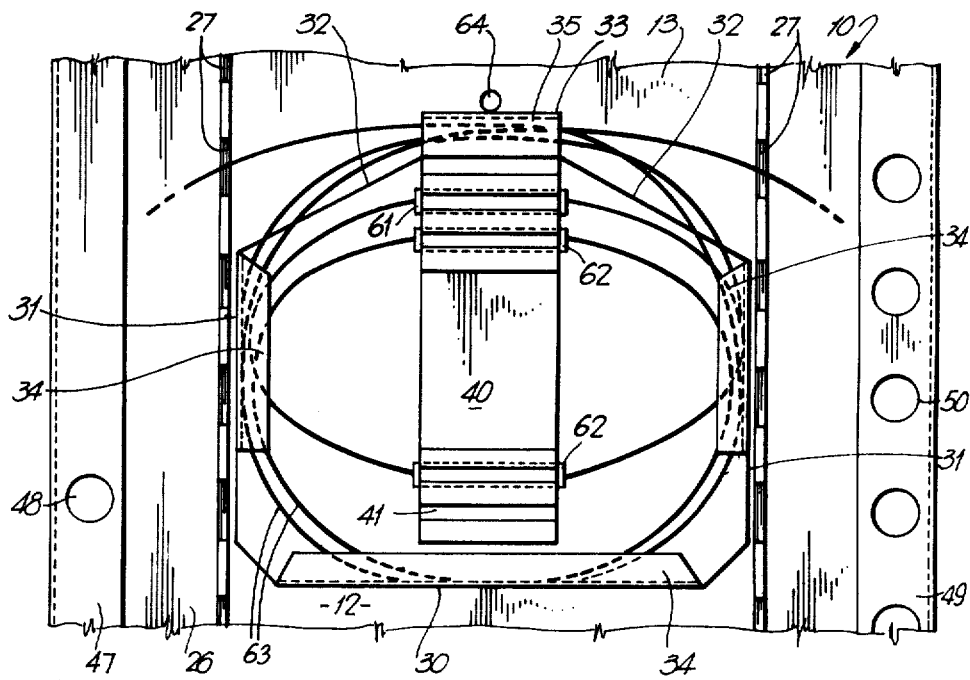
Fig-7-

PROTECTION CASE FOR OPTICAL FIBER SPLICES

This invention relates to a protection case for optical fiber splices, the case accommodating a plurality of spliced pairs of optical fibers, for telecommunications.

The protection case provides an interface between "intra-office" fiber cables and individually buffered "patch-cord" fibers which route to circuit packs. The case provides mounting or support positions for splices, attenuators if desired, and spare fiber lengths also if desired.

Broadly a protection case has an elongate box, access at one end for incoming fiber cable or cables, egress for fibers, and a plurality of packet members or assemblies hingedly attached to the base of the box, the packet members extending laterally across the box and pivoting about axes transverse to the length of the box.

The invention will be readily understood by the following description of an embodiment, by way of example, in conjunction with the accompanying drawings, in which:

FIG. 1 is a perspective view of a protection case, with the lid removed, and packet members illustrated in each of the two possible positions;

FIG. 2 is a top plan view of the base member, with cover removed, and some packet members in position;

FIG. 3 is a cross-section on the line 3—3 of FIG. 2;

FIG. 4 is a plan view of a packet member to a larger scale;

FIG. 5 is a edge view of a packet member in the base member, similar to FIG. 2, to a larger scale, illustrating the optical splices, and attenuator, in position.

FIGS. 6 and 7 illustrate, to a larger scale, a packet member with, respectively, a splice in position and an attenuator and two splices in position.

As illustrated in FIG. 1, the protection case comprises an elongate base member 10, a cover 11, a trough-shaped insert 12 and a plurality of packet members 13.

Describing each member in more detail, with respect to FIGS. 1, 2 and 3, the base member 10 has upturned sides 15 and one end 16 joined to the sides 15. At the other end of the base member, the base is extended at 17 beyond the sides 15 and a web 18 extends across the base member joining the ends of the sides, and defining, with an upturned end 19, a trough 20. Apertures 21 and 22 are formed in the web 18. Slots 23 are formed in the extension 17, the slots extending up into the end 19.

Within the base member 10 is the trough-shaped insert 12. The insert has a flat base attached, as by spot welding, to the base of the base member 10, and has upturned sides 25. The sides 25 are spaced from and extend parallel to the sides 15 to form ducts 26. The sides 25 are slotted at 27 to form comb-like structure along each side. Instead of a single trough shaped insert, two spaced apart inserts can be provided, to form the ducts 26.

Within the insert 12 are mounted a plurality of the packet members or assemblies 13. As illustrated in more detail in FIGS. 4 and 5, each packet member is somewhat rectangular in plan form, having a flat main web portion 29, with a top 30, and two sides 31 extending normal thereto. The bottom is not straight but has two inclined sections 32 joined by a short base section 33. The top 30 and sides 31 are turned up and over for at least part of their lengths, as illustrated at 34, to form channels, and also the short base section 33 is turned up and over, at 35 to form a further channel. Thus each packet member forms what is effectively a shallow box. At the short base section 33 a cloth hinge 36 is provided by which a packet member is attached or connected to the base of the insert 12. While the hinges are indicated in FIG. 3, a hinge is seen more clearly in FIG. 5.

Positioned in each packet member is a holding member 40 conveniently of molded or extruded resilient material such as foam rubber. Each member 40 has a number of transverse grooves 41 at each end. Over the holding member 40 is a flexible retaining member 42 which snaps under the turned over portions 34 and 35 on the top 30 and short base section 33. This is seen in FIG. 5.

As seen in FIG. 2, a fiber cable 45 enters via trough 20 and through aperture 21. Strain relief is provided by a strain relief bracket 46. Instead of a single optical fiber cable, up to four cables can be connected, entering and exiting via trough 20 and apertures 21 and 22, incoming cables being gripped at the strain relief bracket 46. In addition each cable can be individually gripped by strain relief members attached to a flange 47 extending for part of the one side 15. The strain members, not shown, are attached to the flange 47 by screws 48. This is the ingoing side, for the "intra-office" cables.

At the other side of the case, optical fibers would emerge into the right hand duct of FIG. 2, and individual strain members can be attached to a flange 49 on the other side 15 by screws 50. The fibers pass along the duct 26, exiting via aperture 22 (FIG. 1) into the trough 20. A further strain relief bracket can be provided at 51 for outgoing cables.

The cover 11 as seen in FIG. 1, has a tongue 52 formed at an end 53 which fits into a slot, not shown, in end 16 of the base member. At the other end 54, the cover overlaps the top of the web 18, which is higher than the sides 15 of the base member, and also has short corner pieces 55. The cover is thus located at both ends, the sides of the cover butting on to the sides 15 of the base member. The cover does not extend over the trough 20 in the example illustrated. The cover is retained at end 54 by screws passing through holes 56 into nuts or similar members attached to the bottom of the base member.

FIGS. 6 and 7 illustrate the alternate arrangements of a splice positioned in a packet member and an attenuator with related splices positioned in a packet member. Normally a packet member holds one splice, such as when a pair of fibers, one from each cable, is spliced. Such is seen in FIG. 6, the splice indicated at 60, or an attenuator which is connected to the pair of fibers, one from each cable, by two splices. In FIG. 7, the attenuator is indicated at 61 and the two splices at 62. The fibers are coiled around in the packet, as indicated at 63. The fibers enter from a duct 26 and pass under the turned over portion 35. Similarly fibers exit from under the turned over portion 35 to a duct 26. In both instances the fibers also pass through one of the slots 27. By so arranging for the fibers to pass under the turned over portion, both on initial entry and prior to exit, the fibers rotate as a packet member is pivotted up or down, rather than bend. This avoids possible damage or breakage. There will be extra fiber before and after a splice, as in FIG. 6, and extra fiber before one splice, after the other splice and between each splice and the attenuator, as in FIG. 7. It may be necessary to vary the diameter of the coil of fiber, and fiber can be positioned in any spare groove 41 to make adjustment for the length of fiber to be accommodated.

In the particular example, sixteen packet members or assemblies are provided and the protection case is dimensioned for installation on standard equipment racks. The protection case has a low profile and can be mounted on the back of equipment racks which have no available rack space. Again, in the example, the packet members are approximately three inches by 3¾ inches, but these dimensions can vary, as can the number of splices and/or attenuators carried by each packet member. Conveniently the splices and attenuators are a push fit into the grooves 41, being retained by the resilience of the material of the member 40, and the strap 42. However other ways of mounting the splices and attenuators can be used.

The invention provides a compact assembly having a low profile and yet which allows ready access to a particular splice and/or attenuator by simply flipping up the packet members prior to that packet member to which access is required. In the packaged or stored position the packet members lie at an angle of about 30° to the horizontal, and when flipped up move to approximately 15° beyond the vertical. This can be achieved by a self-limiting effect of the hinges or by a suitable stop at the end remote from the entry and exit trough 17. For initial location of the packet members small holes or other locating marks 64 can be provided in the base of the insert 12.

What is claimed is:

1. A protection case for optical fiber splices, comprising:
    an elongate box having a base member and a cover removably attached to the base member;
    at least one insert in said base member defining a duct extending along each side of said base member;
    a plurality of packet members pivotally attached to the base member, the packet members positioned between the ducts, each packet member including a hinge attached to the base member, the hinges attached at spaced apart positions along a longitudinal axis of the base, the packet members in an overlapping relationship when pivotted down in the base member and pivotal to at least a vertical position, extending up from said base member;
    each of said ducts having a side adjacent to said packet members and a plurality of slots in each of said sides, a slot in each side aligned approximately with each hinge, for passage of fibers along each duct and entering to and exiting from said packet members through said slots.

2. A protection case as claimed in claim 1, said base having upturned sides, an insert in said base, said insert having sides extending parallel to and spaced from said upturned sides of said base to define said ducts.

3. A protection case as claimed in claim 2, said upturned sides of said base including a flange extending inwardly on each side, and screws in said flanges for attachment of strain relief members thereto.

4. A protection case as claimed in claim 1, each packet member comprising a flat web portion having a top, sides and a bottom, said top, sides and bottom turned up and over to form channels.

5. A protection case as claimed in claim 4, said bottom comprising three sections, a central base section extending normal to the sides and an inclined section extending from each side to said base section, said inclined sections extending inwardly from said sides in a direction away from said top.

6. A protection case as claimed in claim 5, said hinge attached to each of said packets at said central base section.

7. A protection case as claimed in claim 6, said hinge being a cloth hinge.

8. A protection case as claimed in claim 4, including a holding member in each of said packets comprising a length of molded resilient material extending from adjacent said top to adjacent said bottom of a packet, and including a plurality of transverse grooves extending across the holding member.

9. A protection case as claimed in claim 8, including two transverse grooves at each end of the holding member.

10. A protection case as claimed in claim 4, including a flexible retaining member extending from said top to said bottom of each packet, opposite ends of a retaining member positioned under the turned over portion at said top and bottom.

11. A protection case as claimed in claim 4, said base having an extension at one end, an upturned end member at said one end, a web extending across between the sides of the base, spaced from and parallel to said upturned end and slots formed in said web, the upturned end and said web defining a trough for passage of optical fiber cables into and out of said protection case, and strain relief means in said trough.

* * * * *